UNITED STATES PATENT OFFICE.

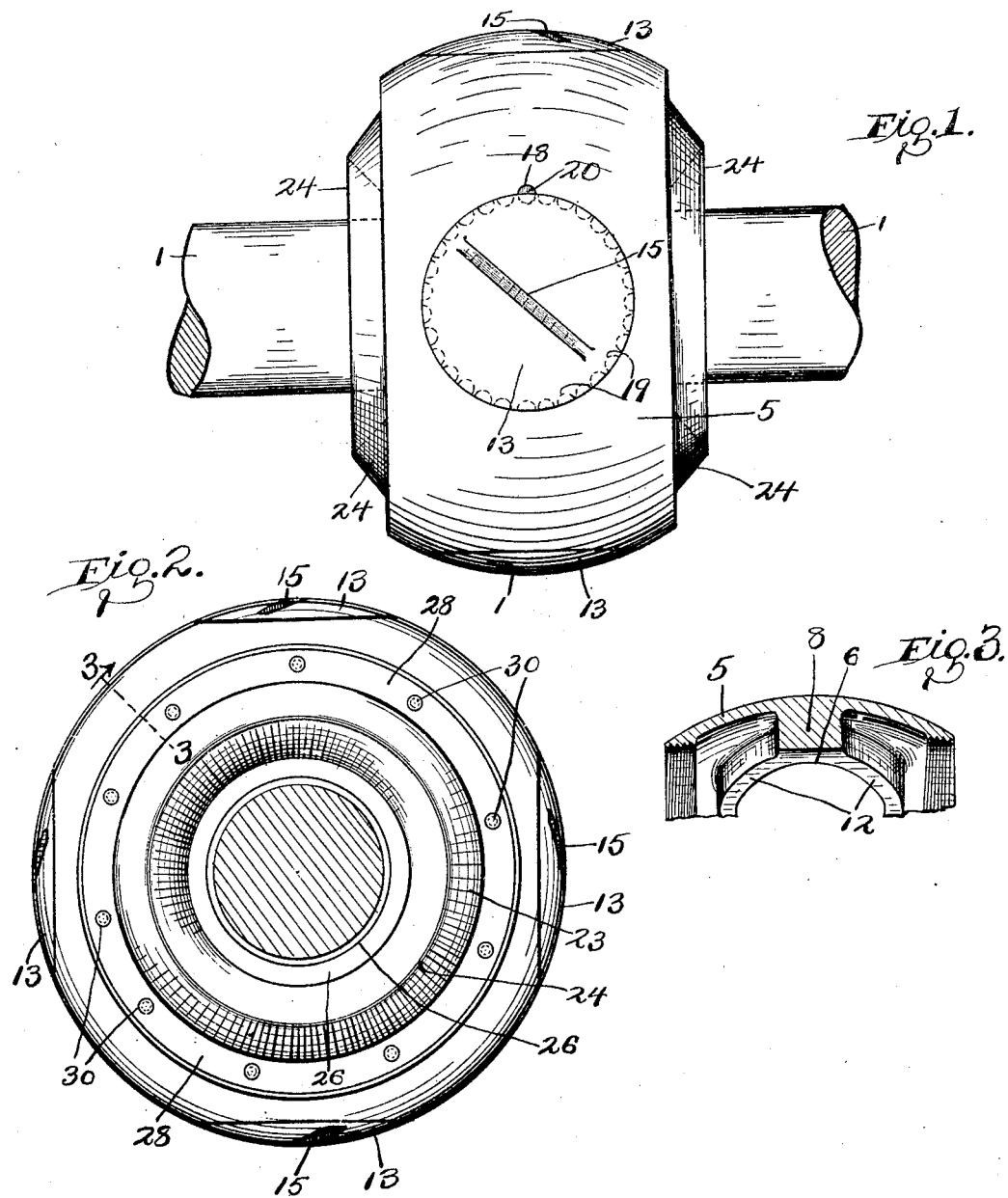

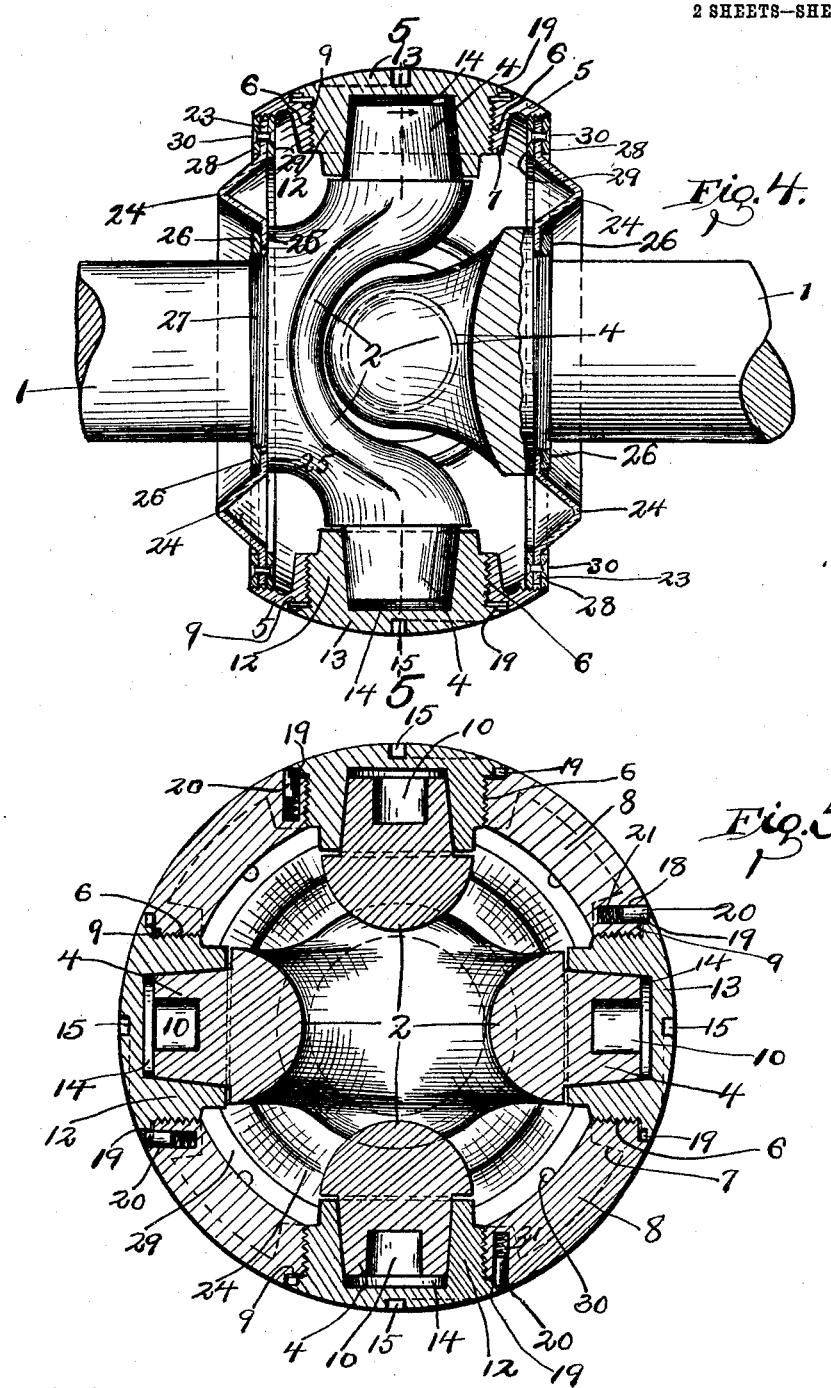

PATRICK L. HUSSEY, OF CLEVELAND, OHIO.

UNIVERSAL JOINT.

No. 804,953.

Specification of Letters Patent.

Patented Nov. 21, 1905.

Application filed July 10, 1905. Serial No. 269,060.

*To all whom it may concern:*

Be it known that I, PATRICK L. HUSSEY, a citizen of the United States of America, residing at Cleveland, in the county of Cuyahoga and State of Ohio, have invented certain new and useful Improvements in Universal Joints; and I hereby declare the following to be a full, clear, and exact description of the invention, such as will enable others skilled in the art to which it pertains to make and use the same.

This invention relates to improvements in universal joints.

The object of this invention is to provide a joint of this character which will be very compact and which will present a smooth exterior surface.

Another object of this invention is to simplify the construction and assembling of joints of this character and to provide means for taking up the wear on the bearing parts of the joint and also to provide means for holding a quantity of a lubricant around the bearings of the joint.

The invention consists in providing a bearing-carrying member for the joint members arranged to incase the joint members and having such an arrangement of parts that the joint members may be inserted therein from opposite sides, each joint member being seated in the bearing-carrying member by first introducing one member of the fork thereof into the bearing-carrying member and allowing it to travel past its normal position and then introducing the other member of the fork into the bearing-carrying member and then centralizing the joint member in the casing.

My invention further consists in providing new und improved end pieces for the casing which will effectually prevent the escape of oil from the casing, while allowing the joint members the greatest possible range of movement.

My invention further consists in providing adjustable bearings for the trunnions on the joint members and new and improved means for locking said bearings in their proper adjustment.

My invention further consists in the features of construction and combination of parts, as described in the specification, pointed out in the claims, and illustrated in the drawings.

In the accompanying drawings, Figure 1 is a side elevation of my universal joint. Fig. 2 is an end elevation of same. Fig. 3 is a section on line 3 3, Fig. 4. Fig. 4 is a view showing the bearing-carrying member in central section and the joints in elevation with a part of one of the joints broken away. Fig. 5 is a section on line 5 5, Fig. 4.

Referring to the drawings, it will be seen that the joint members proper are in every way identical, each joint member comprising a shank portion 1, which is provided with a forked end portion 2, the fork members of which are provided with trunnions 4. Each trunnion 4 is tapered toward its ends preferably in the form of a truncated cone, and in the end thereof is formed a pocket 10, which constitutes a grease-cup. The bearing member comprises a shell 5, preferably in the form of a broad ring, in which are formed two pairs of openings 6. The openings constituting each pair are arranged diametrically opposite each other, and the pairs of openings are arranged, preferably, at a right angle to each other. Around each of the openings 6 on the interior surface of the shell 5 is formed an annular interiorly-screw-threaded flange 7. Strengthening-ribs 8 are arranged on the interior surface of the shell 5, extending between the said annular flanges 7. Around each of the openings 6 on the exterior surface of the shell 5 is formed a seat 9. In each of the openings 6 in the shell 5 is arranged an adjustable bearing which comprises an exteriorly-screw-threaded bearing-ring 12, which is preferably provided with a cap 13, which is arranged to fit into the seat 9 in the shell 5, and the outer surface of the said cap 13 is arranged to lie flush with the outer surface of the said shell 5, so that the whole exterior surface of said bearing-carrying member is perfectly smooth. The openings 14 in the bearing-rings for receiving the trunnions on the joint members are tapered to correspond to the taper on the trunnions. Slots 15 are formed in the caps 13 for receiving the end of a tool by means of which the bearings can be screwed into the openings 6. It will be readily seen that owing to the shape of the trunnions and the corresponding shape of the openings in the bearing-rings perfect adjustment of the bearings can be secured at the time the joint is assembled and also all the wear can be readily taken up and compensated from time to time by screwing in the said bearings. In order to hold each bearing in its proper adjustment, a locking device is provided therefor, which is arranged as follows: At one end of each of the openings 6 is formed a pocket 18, part of which lies in the seat 9 and part of which extends beyond the said seat 9, so that only a portion of the said pocket is covered by the cap 13 on the bearing-ring. In the under surface of the cap 13 is formed a series of depressions 19, which are arranged to register with the pocket 18. In the pocket 18 is located a dog 20, beneath which is arranged a coil-spring 21, the tendency of which is to force the dog above the top of the pocket, and a portion of said dog will therefore enter one of the depressions on the under surface of the cap and lock the bearing against rotation, and a portion of the dog will also be exposed so that it can be engaged and depressed when it is desired to unlock the bearing.

In order that the bearing-carrying member will be perfectly oil-tight and dust-proof, end pieces are provided for the shell 5, each of which comprises a piece of leather or other flexible non-porous material 23, having a greater area than the openings at the ends of the shell 5. Each end piece is arranged around the shank portion of the joint member, so as to rest on a shoulder 25 on said shank portion, and is clamped thereon by means of a screw-threaded ring 26, which engages a screw-thread 27, formed on the shank portion. The outer edge of each of the end pieces 23 is clamped between two annular plates 28 and 29, which are secured together by means of rivets 30, and the said plates 28 and 29 are screw-threaded, so as to screw into the ends of the shell 5. The excess of material in the end pieces 23 is disposed in crimps or folds 24. These end pieces offer absolutely no resistance to the movement of the joints and together with the shell 5 form an absolutely dust-proof and oil-tight casing.

What I claim is—

1. In a universal joint the combination of two joint members having forked ends arranged to be disposed at an angle to each other, a bearing-carrying member arranged to incase said joint members, said bearing-carrying member having an opening at each end so that each joint member may be mounted in the said bearing-carrying member by introducing one of the fork members thereof into the bearing member and allowing said fork member to travel past its normal position and then introducing the other member of the fork into the casing and means for centralizing each joint member in the bearing-carrying member.

2. In a universal joint the combination of two joint members having forked ends arranged to be disposed at an angle to each other, trunnions arranged on said forked ends, a bearing-carrying member arranged to inclose said joint members, bearings arranged in said bearing-carrying member arranged for receiving the trunnions on the joint members and means for adjusting said bearings so as to centralize the joint members in the bearing-carrying member and compensate the wear on the members.

3. In a universal joint, the combination of two joint members having forked ends, a casing arranged to inclose said forked ends, trunnions formed on said forked ends, said trunnions having sockets formed in their ends for receiving a quantity of grease and bearings arranged to inclose said trunnions so as to prevent the escape of grease from the said sockets.

4. In a universal joint the combination of two joint members having forked ends, a bearing-carrying member arranged around said forked ends, two pairs of bearings for said forked ends mounted in said bearing-carrying member and means for adjusting said bearings so as to cause them to project beyond the interior surface of said bearing-carrying member in order to centralize said joint members and prevent the forked ends thereof from being withdrawn from said casing.

5. In a universal joint the combination of two joint members having forked ends arranged to be disposed at an angle to each other, tapered trunnions arranged on said forked ends of said joint members, a bearing-carrying member, bearings mounted in said bearing-carrying member and provided with openings for receiving the trunnions on the joint members, said openings being tapered corresponding to the taper on the trunnions and means for adjusting said bearings.

6. In a universal joint the combination of two joint members having forked ends, a bearing-carrying member provided with two pairs of openings, one pair of openings being arranged at an angle to the other pair of openings, bearings arranged in said openings for receiving the ends of the forks on the joint members and means for adjusting said bearings.

7. In a universal joint the combination of two joint members having forked ends arranged at an angle to each other, a bearing-carrying member provided with two pairs of screw-threaded openings, one pair of openings being arranged at an angle to the other pair of openings, exteriorly-screw-threaded bearings arranged to screw into said openings and means for locking said bearings in said bearing-carrying member.

8. In a universal joint the combination of two joint members having forked ends provided with tapered trunnions, a bearing member provided with two pairs of screw-threaded openings, exteriorly-screw-threaded bearing-rings arranged to screw into said openings, the openings in said bearing-rings for receiving the trunnions being tapered corresponding to the taper on said trunnions and means for locking said bearing-rings in said bearing-carrying member.

9. In a universal joint the combination of two joint members having forked ends, a bearing-carrying member having a smooth exterior surface and provided with two pairs of openings, one pair of openings being arranged at a right angle to the other pair of openings, seats being formed in the exterior surfaces of said bearing-carrying member around said openings, bearing-rings arranged in said openings and caps arranged on said bearing-rings and adapted to fit into the seats in said bearing-carrying member so that their outer surfaces are flush with the outer surfaces of said bearing-carrying member.

10. In a universal joint the combination of two joint members having forked ends, a bearing-carrying member provided with two pairs of openings, bearing-rings arranged in said openings, a spring-actuated dog arranged at the side of each opening and means arranged on the bearing-rings and adapted to be engaged by said dogs so as to lock said bearing-rings in said openings.

11. In a universal joint the combination of two joint members having forked ends, a bearing-carrying member, said bearing-carrying member provided with two pairs of screw-threaded openings, bearing-rings arranged to screw into said openings, caps arranged on said bearing-rings and provided with a series of depressions on their under surfaces, pockets being formed at the side of each opening and extending partly under said caps and a spring-controlled dog arranged in each pocket so that part of the said dog will enter a depression in the cap and a part thereof be exposed so that it can be engaged and depressed, substantially as described and for the purpose set forth.

12. In a universal joint the combination of two joint members having forked ends, a bearing-carrying member arranged to inclose said joint members, said bearing-carrying member being provided with two pairs of openings, annular flanges being formed on the interior surface of said bearing-carrying member around said openings, and strengthening-ribs arranged to extend between said annular flanges, and bearings mounted in said openings and arranged to receive the forked ends of the joint members.

13. In a universal joint the combination of two joint members having forked ends, a casing arranged around the forked ends of said joint members and having an opening at each end through which the shanks of the joint members project and means for closing said openings comprising sheets of non-porous flexible material of greater area than said openings, the excess of material in said sheets being disposed in folds or crimps, means for clamping said sheets around the shank portions of the joint members and means for securing the said sheets around the edges of the openings in the said casing.

14. The combination of two members provided with corresponding screw-threads, one of said members being provided with a cap arranged to lap over the other member, said cap being provided with a series of depressions on its under surface, a pocket being formed in the other member and extending partly under the said cap, and a spring-controlled dog arranged in said pocket so that part thereof will extend into a depression in the said cap and part thereof will be exposed so that it can be engaged and depressed.

In testimony whereof I sign the foregoing specification in the presence of two witnesses.

PATRICK L. HUSSEY.

Witnesses:
VICTOR C. LYNCH,
N. L. MCDONNELL.